United States Patent
Gronát et al.

(10) Patent No.: US 11,297,096 B2
(45) Date of Patent: Apr. 5, 2022

(54) GAUSSIAN AUTOENCODER DETECTION OF NETWORK FLOW ANOMALIES

(71) Applicant: Avast Software s.r.o., Prague (CZ)

(72) Inventors: Petr Gronát, Prague (CZ); Mikuláš Zelinka, Prague (CZ)

(73) Assignee: Avast Software, s.r.o., Prague (CZ)

( * ) Notice: Subject to any disclaimer, the term of this patent is extended or adjusted under 35 U.S.C. 154(b) by 419 days.

(21) Appl. No.: 16/584,552

(22) Filed: Sep. 26, 2019

(65) Prior Publication Data
US 2020/0106805 A1 Apr. 2, 2020

Related U.S. Application Data

(60) Provisional application No. 62/737,640, filed on Sep. 27, 2018.

(51) Int. Cl.
*H04L 29/06* (2006.01)
*G06N 3/08* (2006.01)
*G06K 9/62* (2022.01)

(52) U.S. Cl.
CPC ........ *H04L 63/1441* (2013.01); *G06K 9/6256* (2013.01); *G06N 3/08* (2013.01); *H04L 63/1416* (2013.01); *H04L 63/1433* (2013.01)

(58) Field of Classification Search
CPC ............. H04L 63/1441; H04L 63/1416; H04L 63/1433; H04L 63/1425; H04L 63/145; G06K 9/6256; G06K 9/6239; G06K 9/627; G06N 3/08; G06N 3/084; G06N 7/005; G06N 20/00
See application file for complete search history.

(56) References Cited

U.S. PATENT DOCUMENTS

| | | | | |
|---|---|---|---|---|
| 10,397,255 | B1* | 8/2019 | Bhalotra | H04L 63/1416 |
| 10,771,490 | B2* | 9/2020 | Myers | H04L 43/062 |
| 10,902,105 | B2* | 1/2021 | Strong | H04W 12/12 |
| 11,151,251 | B2* | 10/2021 | Desimone | G06F 9/544 |
| 2019/0243872 | A1* | 8/2019 | Komatsu | G06K 9/00523 |
| 2020/0349255 | A1* | 11/2020 | Sunkavally | G06F 16/244 |

OTHER PUBLICATIONS

Doersch, Carl, Tutorial on Variational Autoencoders, arXiv.org, Aug. 16, 2016, 23 pages, Cornell University, https://arxiv.org/pdf/1606.05908.pdf. Accessed Jan. 8, 2020.

* cited by examiner

*Primary Examiner* — Beemnet W Dada
(74) *Attorney, Agent, or Firm* — Avek IP, LLC; William B. Kircher

(57) ABSTRACT

A method of identifying malicious activity in a computer data sequence includes providing provided the computer data sequence to a network configured to convert the computer data sequence from a high-dimensional space to a low-dimensional space, and processing the computer data sequence in the low-dimensional space to generate an approximately Gaussian distribution. The processed computer data sequence converted to the low dimensional space is evaluated relative to the approximately Gaussian distribution to determine whether the computer data sequence is likely malicious or likely benign, and an output is provided indicating whether the computer data sequence is likely malicious or likely benign.

20 Claims, 6 Drawing Sheets

GAUSSIAN AUTOENCODER DETECTION OF NETWORK FLOW ANOMALIES

CROSS-REFERENCE TO RELATED APPLICATION

This Application claims priority to U.S. Provisional Patent Application Ser. No. 62/737,640, filed on Sep. 27, 2018, entitled "GAUSSIAN AUTOENCODER DETECTION OF NETWORK FLOW ANOMALIES," currently pending, the entire disclosure of which is incorporated herein by reference.

FIELD

The invention relates generally to detection of malicious activity in computer systems, and more specifically to Gaussian autoencoder detection of network flow anomalies.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are often used to verify the security and integrity of a website, and to identify and fix potential vulnerabilities.

In a more detailed example, a firewall in a home or office may restrict the types of connection and the data that can be transferred between the internal network and an external network such as the Internet, based on firewall rules and characteristics of known malicious data. The firewall is typically a computerized network device that inspects network traffic that passes through it, permitting passage of desirable network traffic while blocking undesired network traffic based on a set of rules. Other systems for intrusion detection and prevention include security applications on smartphones that evaluate various applications as they execute on a user's smartphone to attempt to block execution of malicious applications, antivirus or anti-malware software executing on personal computers, and standalone appliance such as unified threat management (UTM) devices configured to provide a variety of malicious code protection. But, new threats are constantly emerging, making efficient and timely detection of vulnerabilities within a computer device such as a firewall, antivirus application, or UTM device a significant challenge.

It is therefore desirable to manage analysis of executing code on a computerized system such as a smartphone or personal computer to provide efficient detection of vulnerabilities.

SUMMARY

One example embodiment of the invention comprises a method of identifying malicious activity in a computer data sequence, such as a network data flow. The computer data sequence is provided to a network configured to convert the computer data sequence from a high-dimensional space to a low-dimensional space, and the computer data sequence in the low-dimensional space is processed to generate an approximately Gaussian distribution. The processed computer data sequence converted to the low dimensional space is evaluated relative to the approximately Gaussian distribution to determine whether the computer data sequence is likely malicious or likely benign, and an output is provided indicating whether the computer data sequence is likely malicious or likely benign.

In a further example, when the output indicates the data sequence is likely malicious, the computer data sequence is blocked and/or a user is notified of the likely malicious data. In another example, processing the computer data sequence in the low-dimensional space to generate an approximately Gaussian distribution includes adding a regularization term to force a multivariate Gaussian distribution in the low-dimensional space.

In a further example, adding a regularization term to force a multivariate Gaussian distribution in the low-dimensional space includes forcing a zero mean, unit covariance distribution between two or more of the multiple dimensions in the low-dimensional space. In a still further example, the network is a neural network trained to evaluate the provided sequence of computer instructions for malicious activity by establishing an output threshold for which the false positive rate is acceptable.

The details of one or more examples of the invention are set forth in the accompanying drawings and the description below. Other features and advantages will be apparent from the description and drawings, and from the claims.

DETAILED DESCRIPTION

Figure 1:
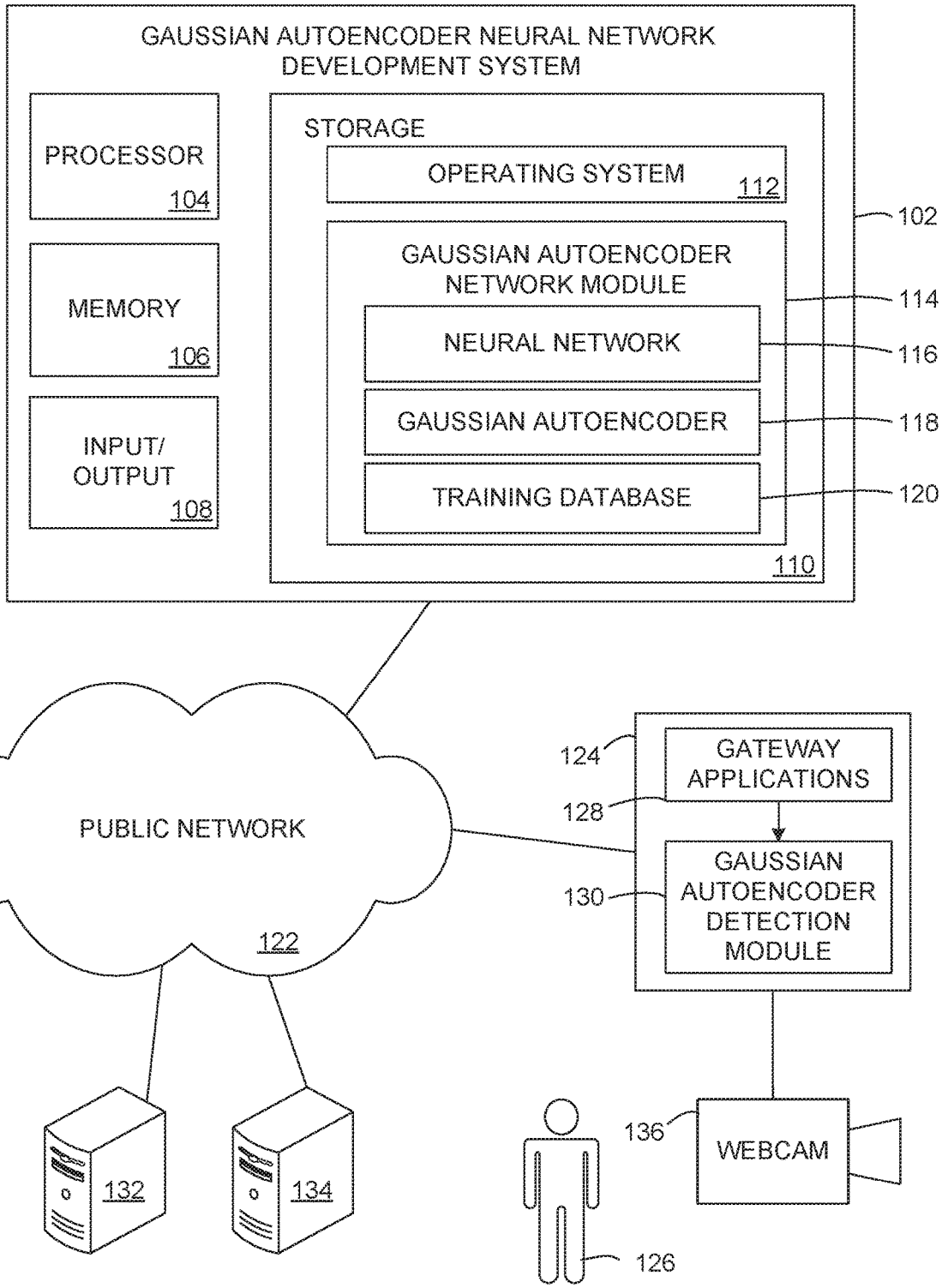
FIG. 1 shows an Internet of Things (IoT) device protected by a Gaussian autoencoder detection module in a networked environment, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Smartphone apps, Microsoft Word documents containing macros, Java applets, and other such common documents are all frequently infected with malware of various types, and users rely on tools such as antivirus software or other malware protection tools to protect their computerized devices from harm.

Further, an increasing number of devices such as home appliances, vehicles, and other such devices (known collectively as the Internet of Things, or IoT) are connected to public networks and are susceptible to unauthorized interception or modification of data. For example, many popular security cameras are known to have vulnerabilities enabling attackers to access the device without authorization, enabling the attackers to view and record image data from the cameras or control camera operation. Similar vulnerabilities are known to exist or are likely to exist in other IoT devices, including network-connected home security systems such as electronic locks, home appliances such as smart thermostats or kitchen appliances, and vehicles with network access. The Internet of Things, and associated potential security risks, extend to a wide variety of other environments and applications including commercial applications such as manufacturing monitoring and control systems, medical and health care devices used to diagnose or treat medical conditions, and infrastructure monitoring and control such as bridges, railways, wind farms, and the like.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. Some devices such as Apple smartphones lack the firewalls and the variety of antivirus software available for desktop computers, and rely more strongly on application store screening of new applications to prevent malware. Other mobile devices such as Android devices allow installable antivirus software applications that evaluate various applications as they execute on a user's smartphone to attempt to block execution of malicious applications.

Firewalls, antivirus programs, and other security measure typically inspect data such as network traffic, executing files, and stored files, and prevent transfer, storage, or execution of data believed to be malicious. Determination of whether data is malicious is based on factors such as firewall rules and characteristics of known malicious data. For example, a firewall may restrict data flows to an Internet of Things (IoT) device based on the traffic flow being uncharacteristic of traffic commonly seen for the particular type of device. Other systems for intrusion detection and prevention include security applications on smartphones that evaluate various applications as they execute on a user's smartphone to attempt to block execution of malicious applications, antivirus or anti-malware software executing on personal computers, and standalone appliance such as unified threat management (UTM) devices configured to provide a variety of malicious code protection. But, as new threats are constantly emerging, efficient and timely detection of vulnerabilities within a computer device such as network traffic to an IoT device remains a significant challenge.

Some examples described herein therefore seek to improve the performance of malware recognition software and devices by incorporating a neural network configured to detect malicious activity in a sequence of network packets. In one such example, a sequence of network packets is provided to an autoencoder network configured to compress high-dimensional flow such as the wide variety of instructions and data that can be encoded in network traffic to an IoT device into a lower dimension latent space, in which anomalies or irregularities in network traffic flows can be more easily detected. In a further example, the autoencoder network incorporates a regularization term that enforces approximately a Gaussian or normal distribution of network flow characterizations in the latent space.

FIG. 1 shows an Internet of Things (IoT) device protected by a Gaussian autoencoder detection module in a networked environment, consistent with an example embodiment. Here, a Gaussian autoencoder neural network development system 102 comprises a processor 104, memory 106, input/output elements 108, and storage 110. Storage 110 includes an operating system 112, and a Gaussian autoencoder network module 114 that is operable to train a neural network to detect malicious program instructions when installed in a user device such as Internet of Things (IoT) device like smart thermostat 124.

The Gaussian autoencoder network module 114 further comprises a neural network module 116 operable to train a neural network such as by providing an expected output for a given sequence of input and backpropagating the difference between the actual output and the expected output. The neural network trains by altering its configuration, such as multiplication coefficients used to produce an output from a given input to reduce or minimize the observed difference between the expected output and observed output. In a more detailed example, the neural network 116 converts a computer data sequence from a high-dimensional space to a low-dimensional space. A Gaussian autoencoder 118 in a more detailed example adds a regularization term to force a multivariate Gaussian distribution in the low-dimensional space, such as forcing a zero mean, unit covariance distribution between two or more of the multiple dimensions in the low-dimensional space.

A training database 120 includes a variety of data stream examples that can be used to train the neural network, and in a more detailed example includes a variety of non-malicious code that can be used to help train the neural network to recognize normal data such as that typically seen in a network data flow. Upon completion of initial training or completion of a training update, the neural network 116 being trained is distributed such as via a public network 122 (such as the Internet or a cellular network) to end user devices such as an end user 126's gateway 124. In other embodiments, the trained network is employed via a cloud service, or in a device such as a firewall or router, or in a device such as webcam 136 or another IoT device.

In this example, a user 126 installs the neural network and Gaussian autoencoder onto a computerized device such as gateway 124, such as by downloading and installing it as an app, or selecting to run it as a service as part of the gateway's preconfigured software or via a firmware update. Once installed and active, the neural network and Gaussian autoencoder modules on gateway device 124 in this example are operable to scan network data streams through the gateway device, such as firmware updates or remote commands from networked computers to webcam 136 or other devices connected to the public network 122 through the gateway. This enables the gateway 124 to observe traffic between local devices such as webcam 136 and user 126's remote computer 132 and a malicious user's computer 134.

In a more detailed example, the Gaussian autoencoder network's neural network and Gaussian autoencoder modules are installed on gateway device 124 as a Gaussian autoencoder detection module 130, and one or more gateway applications performs various functions such as firewall, routing, intrusion protection or detection, and the like at 128. The Gaussian autoencoder detection module 130 is operable to scan network data exchanged between an IoT device such as webcam 136 and the public network 122, such as via the gateway applications 128. If the Gaussian autoencoder detection module determines that the data flow is likely malicious, it notifies the user, stops the data flow from reaching connected local devices such as webcam 136, or performs other such functions to prevent the malicious data flow from doing harm to connected devices in various examples, thereby protecting the user 126's webcam 136 and other devices from malicious actions. In a further example, the Gaussian autoencoder detection module is able to determine whether a particular data flow's position in the network's low-dimensional space lies sufficiently far outside the Gaussian distribution of normal data flows to be considered malicious, and to block the data flow, block the source from which the data flow is originating, and/or notify the user 126.

Figure 2:
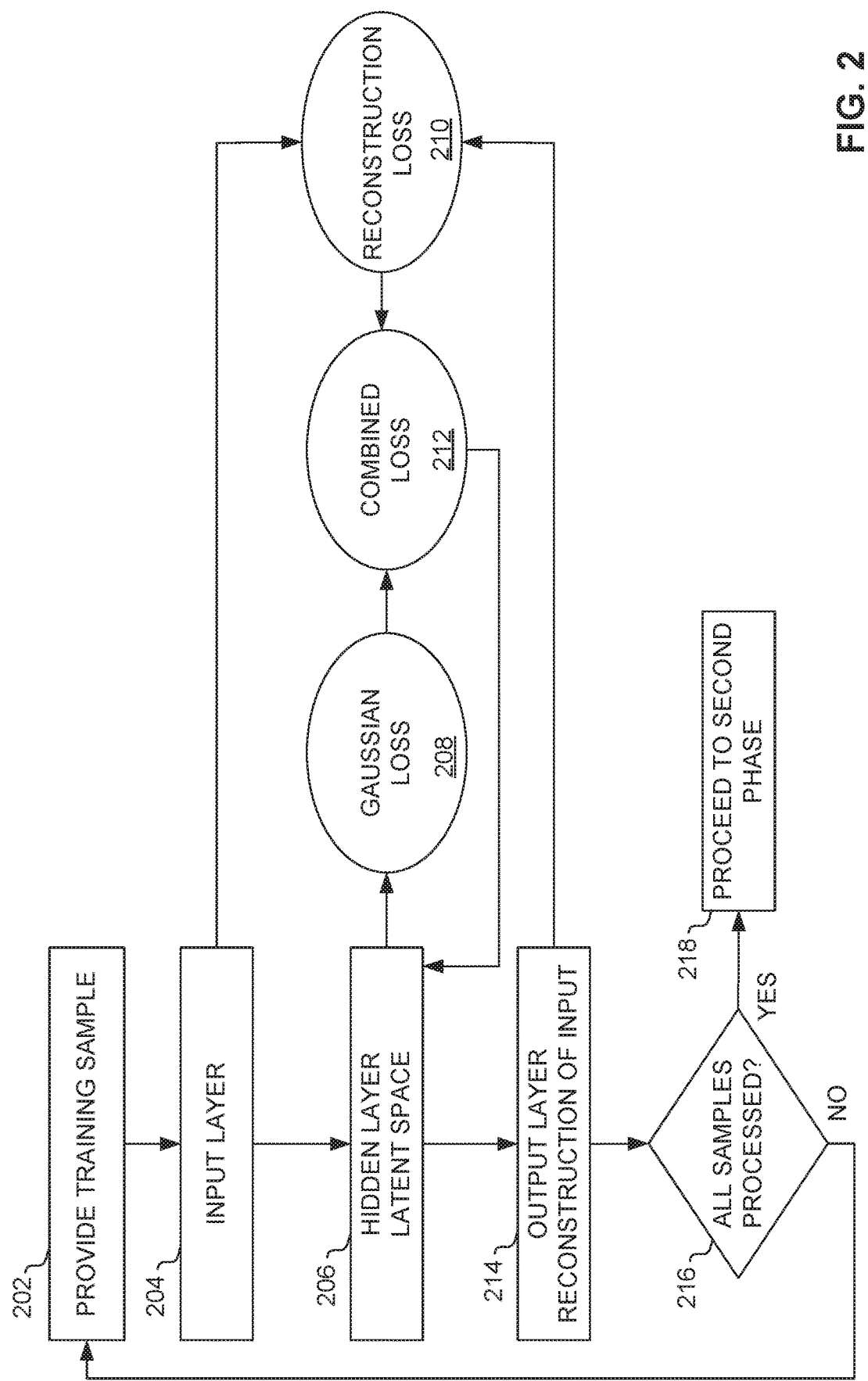
FIG. 2 shows a flowchart illustrating a first phase of training the Gaussian autoencoder detection module's network, as may be used to practice some embodiments.

FIG. 2 shows a flowchart illustrating a first phase of training the Gaussian autoencoder detection module's network, as may be used to practice some embodiments. Here, a batch of training samples such as comprising known benign data streams or in other examples a combination of known benign and known malicious data streams is used to train the neural network portion of the Gaussian autoencoder detection module to distinguish between benign and malicious data streams. The first training sample from the batch is provided to the neural network at 202, being fed to the first or input layer of the neural network at 204. An internal or hidden layer of the neural network comprises the latent space having reduced dimensionality relative to the input layer, from which a low-dimensional output is taken. The low-dimensional output is provided to Gaussian loss 208, which specifies the distance between the latent space distribution of the input sample and a unit Gaussian distribution, forcing the autoencoder's latent space to drift toward a Gaussian distribution as training samples are processed. Reconstruction loss is similarly calculated at 212 based on the error or loss in expanding the low dimensional latent space back to a high-dimensional space such as that of the input layer receiving the training sample as shown at 214. Both the Gaussian loss 208 and the reconstruction loss 210 are used to calculate the combined loss 212, which is backpropagated through the network starting at the latent space layer 206 to train the network to minimize the combined loss, desirably across a large number of training samples. These steps are repeated for each training sample in the training sample set, until all samples are processed at 216 and the training process proceeds to the second phase as indicated at 218.

In a more detailed example, the input X is reduced in the low-dimensionality latent space to $Z=g(X)$, which is reconstructed as $X'=f(g(X))$. The difference between X and X' is therefore the reconstruction loss or error. The latent space or low-dimensional representation of the input Z can be forced into a multivariate Gaussian distribution with zero mean and unit covariance by computing the sum $\Box \exp(-Z^T Z)$. The Gaussian loss 208 and reconstruction loss 210 can be used to calculate the combined loss 212 as $L=L_2(X, X')-\lambda_1 \Box \exp(-Z^T Z)$. This loss equation represents a radial basis function, such that the autoencoder has a radial basis function regularization loss.

Figure 3:
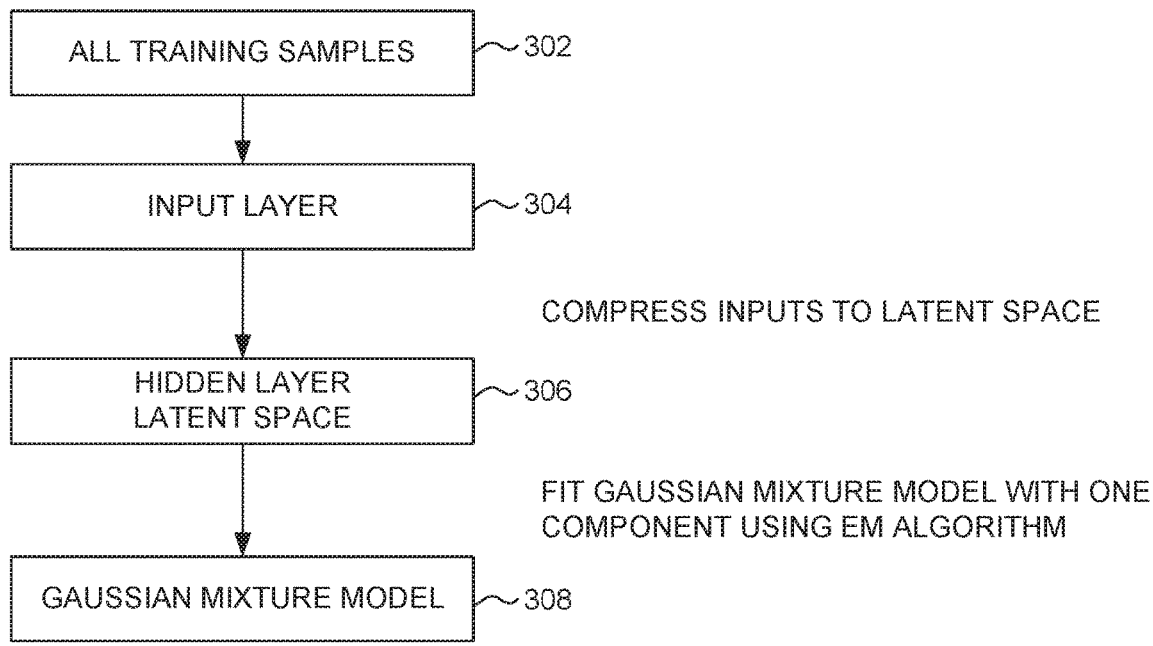
FIG. 3 shows a flowchart illustrating a second phase of training the Gaussian autoencoder detection module's network, as may be used to practice some embodiments.

FIG. 3 shows a flowchart illustrating a second phase of training the Gaussian autoencoder detection module's network, as may be used to practice some embodiments. Here, the neural network of the Gaussian autoencoder detection module that has been trained in the first phase is not further modified. The training samples 302 are again provided as inputs to the first or input layer of the neural network of FIG. 2, as shown at 304. The inputs are compressed into the low-dimensional latent space at 306, and used to compute the latent space distribution of the inputs in the training set. The distribution of inputs is then fit to a Gaussian mixture model at 308 that will, for each sample, indicate how likely it is that the sample comes from the trained distribution (which in this example comprises benign or normal data).

In a more detailed example, given an unknown sample X and its latent space distribution $Z=g(X)$, a threshold $\varphi$ is determined such that (where $\theta$ are parameters of the fitted multivariate Gaussian encoding) if probability $p(Z|\theta)>\varphi$, the data sample X likely came from a normal or benign population of data, and if $p(Z|\theta) \leq \varphi$ the data sample X likely came from anomalous traffic such as malicious traffic.

Figure 4:
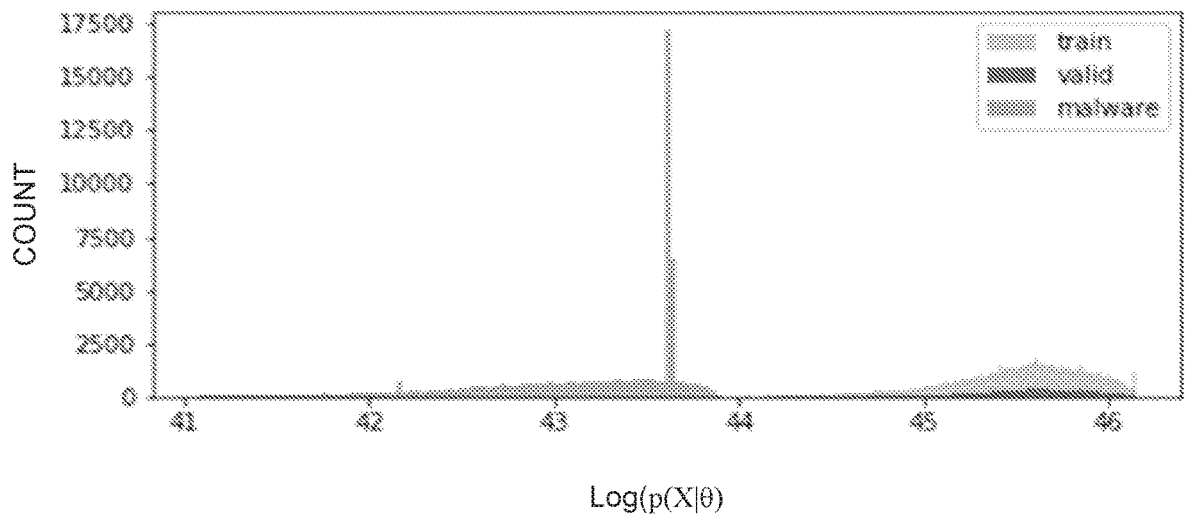
FIG. 4 is a histogram showing the probabilities of normal traffic, including training data and validation data, and anomalous or malign traffic, consistent with an example embodiment.

FIG. 4 is a histogram showing the probabilities of normal traffic, including training data and validation data, and anomalous or malign traffic, consistent with an example embodiment. Here, the vertical or Y-axis represents the number of data samples recorded having each value on the horizontal or X-axis, while the X axis represents the logarithm of the probability function p(X|θ). More specifically, the network of this example was trained with the benign data represented by the light gray or larger shaded region extending approximately between 44 and 46, while valid or benign data observed by the trained network falls into approximately the same area of the histogram and is represented by dark gray. In contrast, the cluster of histogram data in the region from 41-44 shown as medium gray represents malware traffic, and differs significantly in log probability value from the known benign training data or the observed benign data clustered around 45-46. This suggests that a threshold value of approximately 44 may be appropriate to distinguish valid or benign data from anomalous data that is potentially malicious.

Figure 5:
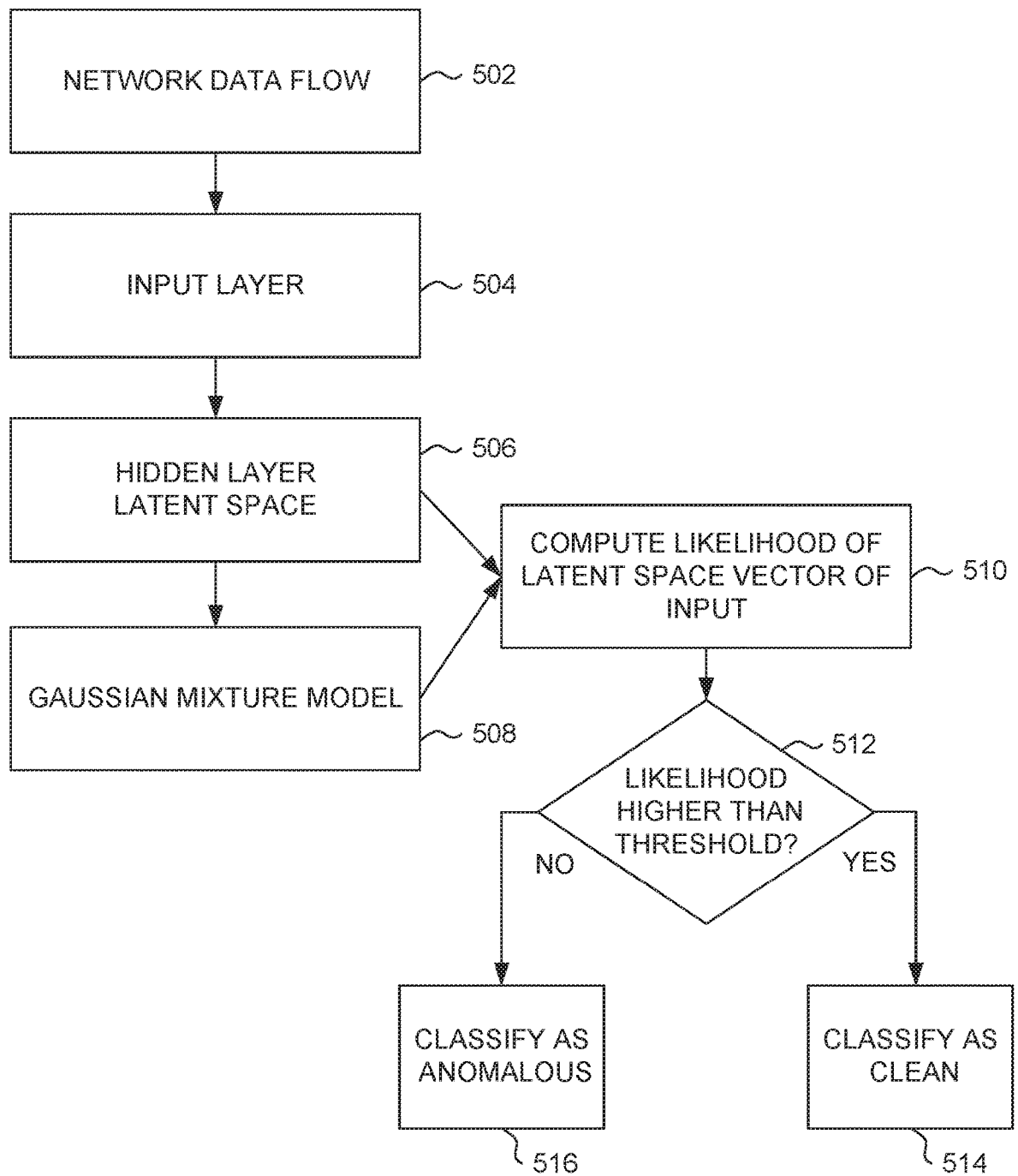
FIG. 5 is a flowchart illustrating a method of evaluating a data flow using a Gaussian autoencoder network to determine whether the data is likely benign or anomalous, consistent with an example embodiment.

FIG. 5 is a flowchart illustrating a method of evaluating a data flow using a Gaussian autoencoder network to determine whether the data is likely benign or anomalous, consistent with an example embodiment. Here, a trained Gaussian autoencoder network observes data from a network data flow 502. The data is provided to input layer 504 of the network, where it is transformed to a low-dimensional latent space at 506. The Gaussian mixture model from training phase 2 as shown at 508 is applied to the latent space representation of the data at 510 to determine whether the data provided to the input layer probability or likelihood function exceeds a threshold at 512, such that if the probability function is higher than the threshold the data is likely benign due to its similarity to the learned benign distribution. Similarly, if the probability function is less than the threshold, the data is considered anomalous and possibly malicious due to its lack of similarity to the learned benign distribution.

Figure 6:
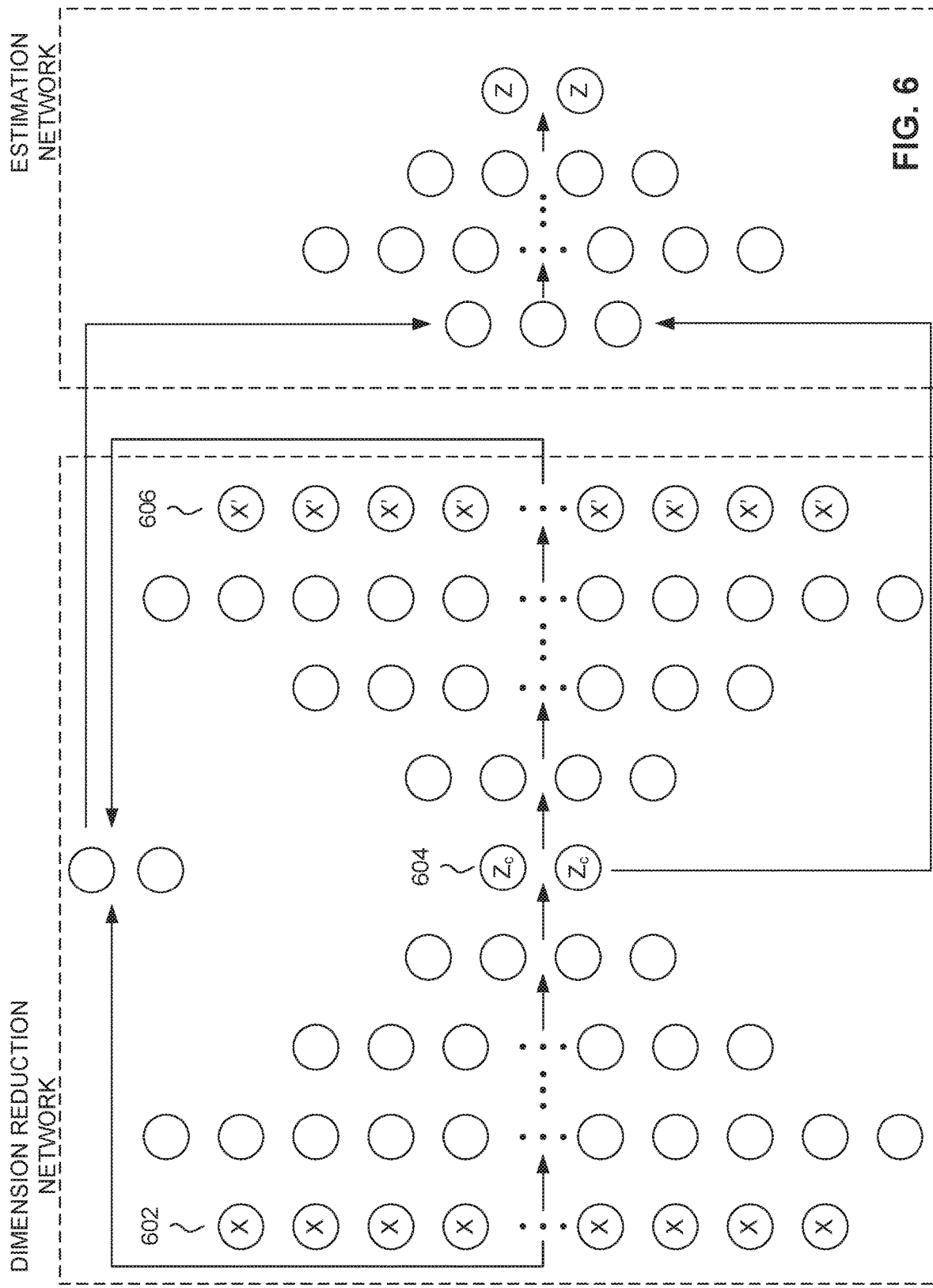
FIG. 6 is a more detailed version of a neural network, as may be used to practice some embodiments of the invention.

FIG. 6 is a more detailed version of a neural network, as may be used to practice some embodiments of the invention. Here, the data stream being monitored is represented as X, and is provided to the input layer of the network shown in the left-most column at 602. The input data X has a dimension of the number of input nodes in the column shown at 602, and as the input data propagates to the right through additional network layers is reduced to the low-dimension latent space $Z_c$ as shown at 604. The input vector is then reconstructed from $Z_c$ as data continues to propagate through layers to the right until it reaches the layer shown at 606, which outputs the reconstructed input data. The difference between the input data X and the reconstructed input X' is used along with the Gaussian loss to train the network such that this difference is minimized across a range of training inputs. This portion of the network of FIG. 6 is referred to here as the dimension reduction network because it learns to reduce the dimensionality of the input data to a low-dimension latent space from which the high-dimension space input can be accurately reconstructed.

A second portion of the network on the right side of FIG. 6 is here referred to as the estimation network, which in this example uses the low-dimension representation of the input and the error between the input data and the reconstructed input data to construct the output vector Z, which in a more detailed example is a multivariate probability having a Gaussian distribution and a zero mean with unit covariance. This probability is compared to a threshold value as in previous examples to determine whether the input X is likely benign or potentially malicious.

Although the network layers of FIG. 6 do not show connection between the nodes of each layer, in a typical neural network each node of a given layer feeds forward to each node of the next layer, with each such connection multiplied by a different coefficient. A layer of nine nodes feeding forward to a layer of eleven nodes would therefore have 99 such connections (calculated as 9×11), each with its own coefficient that is modified during the training process using an error backpropagation process that adapts the coefficients to produce the desired output from a given network input.

The computerized systems such as IoT device or other devices running the trained Gaussian autoencoder module are in some examples computerized devices having The computerized systems such as Gaussian autoencoder neural network development system 102 of FIG. 1 used to train the networks, and the devices such as IoT device 124 that execute the trained network to protect against malicious data can take many forms, and are configured in various embodiments to perform the various functions described herein.

Figure 7:
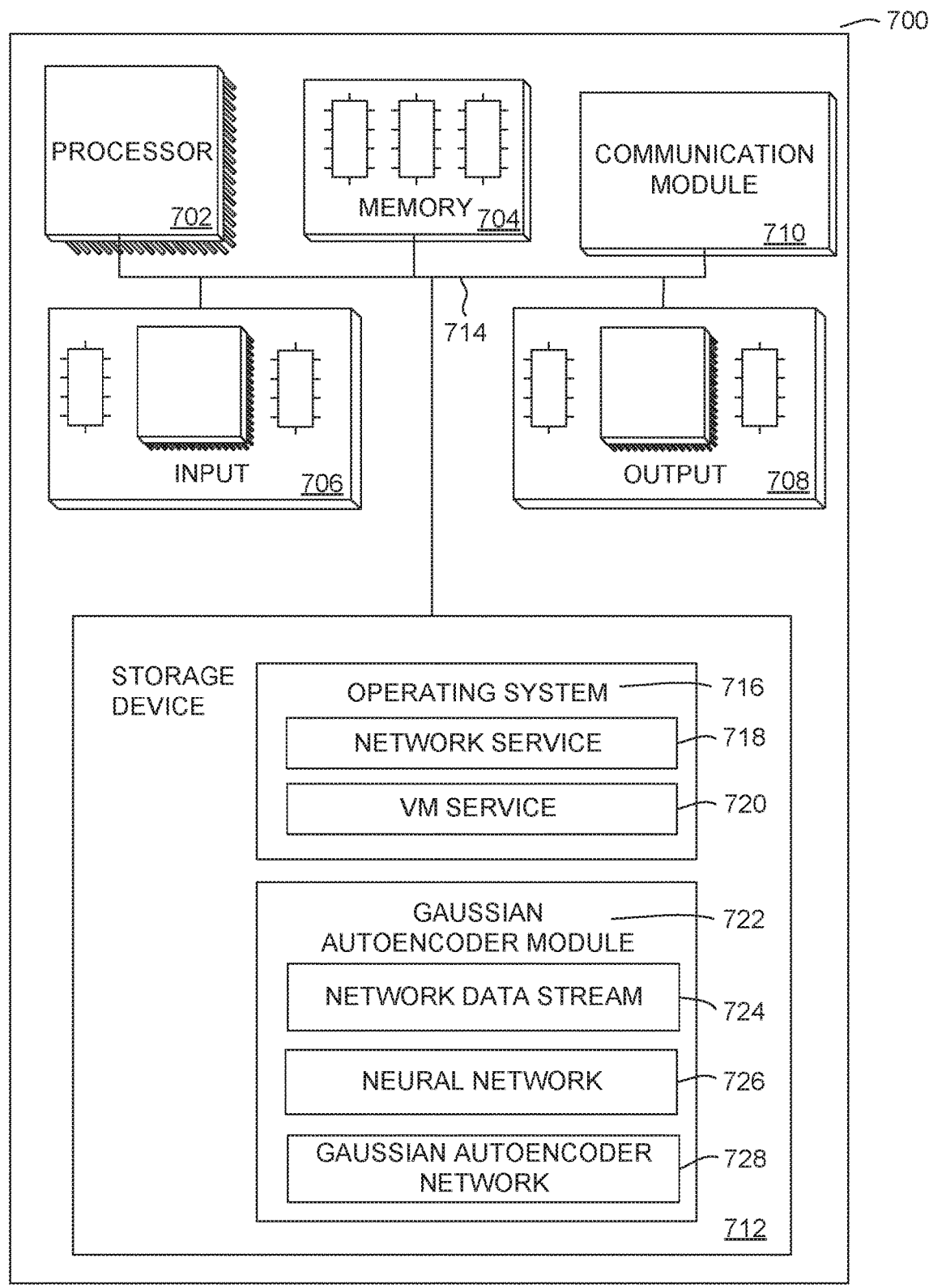
FIG. 7 is a computerized Gaussian autoencoder development system comprising a Gaussian autoencoder module, consistent with an example embodiment of the invention

FIG. 7 is a computerized Gaussian autoencoder development system comprising a Gaussian autoencoder module, consistent with an example embodiment of the invention. FIG. 7 illustrates only one particular example of computing device 700, and other computing devices 700 may be used in other embodiments. Although computing device 700 is shown as a standalone computing device, computing device 700 may be any component or system that includes one or more processors or another suitable computing environment for executing software instructions in other examples, and need not include all of the elements shown here.

As shown in the specific example of FIG. 7, computing device 700 includes one or more processors 702, memory 704, one or more input devices 706, one or more output devices 708, one or more communication modules 710, and one or more storage devices 712. Computing device 700, in one example, further includes an operating system 716 executable by computing device 700. The operating system includes in various examples services such as a network service 718 and a virtual machine service 720 such as a virtual server. One or more applications, such as Gaussian autoencoder module 722 are also stored on storage device 712, and are executable by computing device 700.

Each of components 702, 704, 706, 708, 710, and 712 may be interconnected (physically, communicatively, and/or operatively) for inter-component communications, such as via one or more communications channels 714. In some examples, communication channels 714 include a system bus, network connection, inter-processor communication network, or any other channel for communicating data. Applications such as Gaussian autoencoder module 722 and operating system 716 may also communicate information with one another as well as with other components in computing device 700.

Processors 702, in one example, are configured to implement functionality and/or process instructions for execution within computing device 700. For example, processors 702 may be capable of processing instructions stored in storage device 712 or memory 704. Examples of processors 702 include any one or more of a microprocessor, a controller, a digital signal processor (DSP), an application specific integrated circuit (ASIC), a field-programmable gate array (FPGA), a graphics processing unit (GPU), or similar discrete or integrated logic circuitry.

One or more storage devices 712 may be configured to store information within computing device 700 during operation. Storage device 712, in some examples, is known as a computer-readable storage medium. In some examples, storage device 712 comprises temporary memory, meaning that a primary purpose of storage device 712 is not long-term storage. Storage device 712 in some examples is a volatile memory, meaning that storage device 712 does not maintain stored contents when computing device 700 is turned off. In other examples, data is loaded from storage device 712 into memory 704 during operation. Examples of volatile memories include random access memories (RAM), dynamic random access memories (DRAM), static random access memories (SRAM), and other forms of volatile memories known in the art. In some examples, storage device 712 is used to store program instructions for execution by processors 702. Storage device 712 and memory 704, in various examples, are used by software or applications running on computing device 700 such as malware evaluation module 722 to temporarily store information during program execution.

Storage device 712, in some examples, includes one or more computer-readable storage media that may be configured to store larger amounts of information than volatile memory. Storage device 712 may further be configured for long-term storage of information. In some examples, storage devices 712 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication modules 710. Computing device 700 in one example uses communication module 710 to communicate with external devices via one or more networks, such as one or more wireless networks. Communication module 710 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 700 uses communication module 710 to wirelessly communicate with an external device such as via public network 122 of FIG. 1.

Computing device 700 also includes in one example one or more input devices 706. Input device 706, in some examples, is configured to receive input from a user through tactile, audio, or video input. Examples of input device 706 include a touchscreen display, a mouse, a keyboard, a voice responsive system, video camera, microphone or any other type of device for detecting input from a user.

One or more output devices 708 may also be included in computing device 700. Output device 708, in some examples, is configured to provide output to a user using tactile, audio, or video stimuli. Output device 708, in one example, includes a display, a sound card, a video graphics adapter card, or any other type of device for converting a signal into an appropriate form understandable to humans or machines. Additional examples of output device 708 include a speaker, a light-emitting diode (LED) display, a liquid crystal display (LCD), or any other type of device that can generate output to a user.

Computing device 700 may include operating system 716. Operating system 716, in some examples, controls the operation of components of computing device 700, and provides an interface from various applications such as recommendation module 722 to components of computing device 700. For example, operating system 716, in one example, facilitates the communication of various applications such as malware evaluation module 722 with processors 702, communication unit 710, storage device 712, input device 706, and output device 708. Applications such as malware evaluation module 1022 may include program instructions and/or data that are executable by computing device 700. As one example, Gaussian autoencoder module 722 evaluates a network data stream 724 such as data received from an Ethernet or cellular data connection using trained neural network 726 and Gaussian autoencoder network 728. The Gaussian autoencoder module is operable to perform operations such as restricting processing or execution of network data sequences that are found likely to be anomalous or malicious. These and other program instructions or modules may include instructions that cause computing device 700 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of identifying malicious activity in a computer data sequence, comprising:
providing the computer data sequence into a network configured to convert the computer data sequence from a high-dimensional space to a low-dimensional space;
processing the computer data sequence in the low-dimensional space to generate an approximately Gaussian distribution;
evaluating the processed computer data sequence converted to the low dimensional space relative to the approximately Gaussian distribution to determine whether the computer data sequence is likely malicious or likely benign; and
providing an output indicating whether the computer data sequence is likely malicious or likely benign.

2. The method of identifying malicious activity in a computer data sequence of claim 1, wherein the computer data sequence comprises network data exchanged with a computerized device.

3. The method of identifying malicious activity in a computer data sequence of claim 2, wherein the computerized device is an IoT (Internet of Things) device.

4. The method of identifying malicious activity in a computer data sequence of claim 1, further comprising of blocking the computer data sequence once the output indicates the data sequence is likely malicious.

5. The method of identifying malicious activity in a computer data sequence of claim 1, further comprising notifying a user when the output indicates the data sequence is likely malicious.

6. The method of identifying malicious activity in a computer data sequence of claim 1, wherein the network configured to convert the computer data sequence from a high-dimensional space to a low-dimensional space comprises a neural network.

7. The method of identifying malicious activity in a computer data sequence of claim 1, wherein processing the computer data sequence in the low-dimensional space to generate an approximately Gaussian distribution comprises adding a regularization term to force a multivariate Gaussian distribution in the low-dimensional space.

8. The method of identifying malicious activity in a computer data sequence of claim 7, wherein adding a regularization term to force a multivariate Gaussian distribution in the low-dimensional space comprises forcing a zero mean, unit covariance distribution between two or more of the multiple dimensions in the low-dimensional space.

9. The method of identifying malicious activity in a computer data sequence of claim 1, wherein the network is trained to evaluate the provided sequence of computer instructions for malicious activity by establishing an output threshold for which the false positive rate is acceptable.

10. A method of creating a network operable to identify malicious activity in a computer data sequence, comprising:
providing a training computer data sequence into a network configured to convert the computer data sequence from a high-dimensional space to a low-dimensional space;
processing the computer data sequence in the low-dimensional space to generate an approximately Gaussian distribution;
evaluating the processed computer data sequence converted to the low dimensional space relative to the approximately Gaussian distribution to produce an output indicating whether the computer data sequence is predicted to be malicious or benign;
providing an error signal to the network based on the difference between the expected output and the actual output of the network based on whether the training computer data sequence is malicious or benign; and
modifying the network to reduce the difference between the expected output and the actual output, thereby training the network to identify whether a computer data sequence is likely malicious.

11. The method of creating a network operable to identify malicious activity in a computer data sequence of claim 10, wherein the computer data sequence comprises network data exchanged with a computerized IoT (Internet of Things) device.

12. The method of creating a network operable to identify malicious activity in a computer data sequence of claim 10, further comprising at least one of blocking the computer data sequence and notifying a user once the output indicates the data sequence is likely malicious.

13. The method of creating a network operable to identify malicious activity in a computer data sequence of claim 10, wherein processing the computer data sequence in the low-dimensional space to generate an approximately Gaussian distribution comprises adding a regularization term to force a multivariate Gaussian distribution in the low-dimensional space.

14. The method of creating a network operable to identify malicious activity in a computer data sequence of claim 13, wherein adding a regularization term to force a multivariate Gaussian distribution in the low-dimensional space comprises forcing a zero mean, unit covariance distribution between two or more of the multiple dimensions in the low-dimensional space.

15. The method of creating a network operable to identify malicious activity in a computer data sequence of claim 10, wherein the network is a neural network trained to evaluate the provided sequence of computer instructions for malicious activity by establishing an output threshold for which the false positive rate is acceptable.

16. A computerized device operable to identify malicious activity in a computer data sequence, comprising:
a neural network malware evaluation module comprising a processor and a memory device having stored thereon executable instructions that, when executed by the processor, cause the neural network malware evaluation module to evaluate a computer data sequence and to provide an output indicating whether the computer data sequence is likely malicious or likely benign, wherein the neural network malware evaluation module is further operable to convert the computer data sequence from a high-dimensional space to a low-dimensional space, to process the computer data sequence in the low-dimensional space to generate an approximately Gaussian distribution, and to evaluate the processed computer data sequence converted to the low dimensional space relative to the approximately Gaussian distribution to determine whether the computer data sequence is likely malicious or likely benign.

17. The computerized device operable to identify malicious activity in a computer data sequence of claim 16, further comprising at least one of blocking the computer data sequence and notifying a user once the output indicates the data sequence is likely malicious.

18. The computerized device operable to identify malicious activity in a computer data sequence of claim 16, wherein processing the computer data sequence in the low-dimensional space to generate an approximately Gaussian distribution comprises adding a regularization term to force a multivariate Gaussian distribution in the low-dimensional space.

19. The computerized device operable to identify malicious activity in a computer data sequence of claim 18, wherein adding a regularization term to force a multivariate Gaussian distribution in the low-dimensional space comprises forcing a zero mean, unit covariance distribution between two or more of the multiple dimensions in the low-dimensional space.

20. The computerized device operable to identify malicious activity in a computer data sequence of claim 16, wherein the network is a neural network trained to evaluate the provided sequence of computer instructions for malicious activity by establishing an output threshold for which the false positive rate is acceptable.

* * * * *